United States Patent
Ramchandran

(10) Patent No.: US 9,684,478 B2
(45) Date of Patent: Jun. 20, 2017

(54) CONTROLLING DISTRIBUTION OF A DEPLETABLE RESOURCE ON A NETWORK-ENABLED DEVICE

(71) Applicant: HEWLETT-PACKARD DEVELOPMENT COMPANY, L.P., Houston, TX (US)

(72) Inventor: Padmanabhan Ramchandran, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/764,743

(22) PCT Filed: Jan. 31, 2013

(86) PCT No.: PCT/US2013/024042
§ 371 (c)(1),
(2) Date: Jul. 30, 2015

(87) PCT Pub. No.: WO2014/120184
PCT Pub. Date: Aug. 7, 2014

(65) Prior Publication Data
US 2015/0370518 A1  Dec. 24, 2015

(51) Int. Cl.
G06F 21/70 (2013.01)
G06F 3/12 (2006.01)
(Continued)

(52) U.S. Cl.
CPC ....... G06F 3/1239 (2013.01); G03G 15/5079 (2013.01); G03G 15/553 (2013.01);
(Continued)

(58) Field of Classification Search
CPC ........ G07B 17/00193; G07B 17/00508; G07B 2017/00233; G07B 2017/00532; B41J 2/1752; B41J 2/17536; B41J 2/1754; B41J 2/17546; B41J 2/1755; B41J 29/54; B41J 29/56; B41J 29/58; B41J 29/68; G06Q 20/085; G06Q 20/203; G06F 11/30; G06F 21/629; G06F 3/1218; G06F 3/1219;
(Continued)

(56) References Cited

U.S. PATENT DOCUMENTS 6,466,922 B1 * 10/2002 Abumehdi ....... G07B 17/00193
705/410
6,820,972 B2 11/2004 Kinalski
(Continued)

FOREIGN PATENT DOCUMENTS

AU      CA 2400795 A1 *  8/2001  .......... B41J 2/17513
CA          2400795         8/2001
(Continued)

OTHER PUBLICATIONS

International Searching Authority, International Search Report and Written Opinion, Oct. 28, 2013, 9 pages.

*Primary Examiner* — Chad Dickerson
(74) *Attorney, Agent, or Firm* — HP Inc. Patent Dpartment

(57) ABSTRACT

A network-enabled device can operate to permit user access to the depletable resource only if information stored on the device indicates that the replenishment for the depleted resource is being obtained from an appropriate or approved source.

14 Claims, 4 Drawing Sheets

(51) Int. Cl.
  *G06F 11/30* (2006.01)
  *G06F 21/10* (2013.01)
  *G06Q 20/20* (2012.01)
  *G06F 21/62* (2013.01)
  *G03G 15/00* (2006.01)

(52) U.S. Cl.
  CPC .......... *G06F 3/1218* (2013.01); *G06F 3/1219* (2013.01); *G06F 3/1288* (2013.01); *G06F 11/30* (2013.01); *G06F 21/10* (2013.01); *G06F 21/629* (2013.01); *G06Q 20/203* (2013.01)

(58) Field of Classification Search
  CPC ...... G06F 3/1239; G06F 3/1288; G06F 3/129; G06F 21/70; G06F 21/86; G06F 21/87; G06F 21/88
  USPC .................. 705/410; 713/171; 726/2, 34, 35; 399/8–13, 24–29; 358/1.11–1.18, 403, 358/504; 400/693; 902/31; 49/503; 235/382; 340/5.2
  See application file for complete search history.

(56) References Cited

U.S. PATENT DOCUMENTS

| | | | | |
|---|---|---|---|---|
| 6,942,144 | B2* | 9/2005 | Brookner | G07C 9/00658 235/382 |
| 7,216,951 | B2 | 5/2007 | Garrana et al. | |
| 7,434,053 | B2* | 10/2008 | Parry | B41J 2/17546 713/171 |
| 2002/0008883 | A1* | 1/2002 | Shibata | G06Q 10/087 358/1.15 |
| 2004/0099733 | A1 | 5/2004 | Brookner | |
| 2005/0074246 | A1 | 4/2005 | Hayward et al. | |
| 2007/0088613 | A1 | 4/2007 | Adkins | |
| 2007/0188530 | A1 | 8/2007 | Garrana et al. | |
| 2008/0040234 | A1 | 2/2008 | Rankin et al. | |
| 2008/0071626 | A1 | 3/2008 | Hill | |
| 2009/0016743 | A1* | 1/2009 | Tye | G03G 15/5079 399/8 |
| 2012/0027423 | A1* | 2/2012 | Kawai | G03G 15/556 399/12 |
| 2012/0254050 | A1 | 10/2012 | Scrafford et al. | |

FOREIGN PATENT DOCUMENTS

| | | |
|---|---|---|
| CN | 102201083 | 9/2011 |
| CN | 102402739 | 4/2012 |
| EP | 0875865 | 11/1998 |
| JP | H08-039794 | 2/1996 |
| JP | 2002-318511 | 10/2002 |
| JP | 2006-221285 | 8/2006 |
| JP | 2007-219227 | 8/2007 |
| JP | 2008-268781 | 11/2008 |
| JP | 2009-134575 | 6/2009 |
| JP | 2011-008142 | 1/2011 |

* cited by examiner

CONTROLLING DISTRIBUTION OF A DEPLETABLE RESOURCE ON A NETWORK-ENABLED DEVICE

BACKGROUND

Numerous kinds of network-enabled devices exist which use services from the Internet for a variety of purposes. For example, web-based printers exist that use Internet services for maintenance purposes, such as ink status checks and refills.

DETAILED DESCRIPTION

Figure 1:
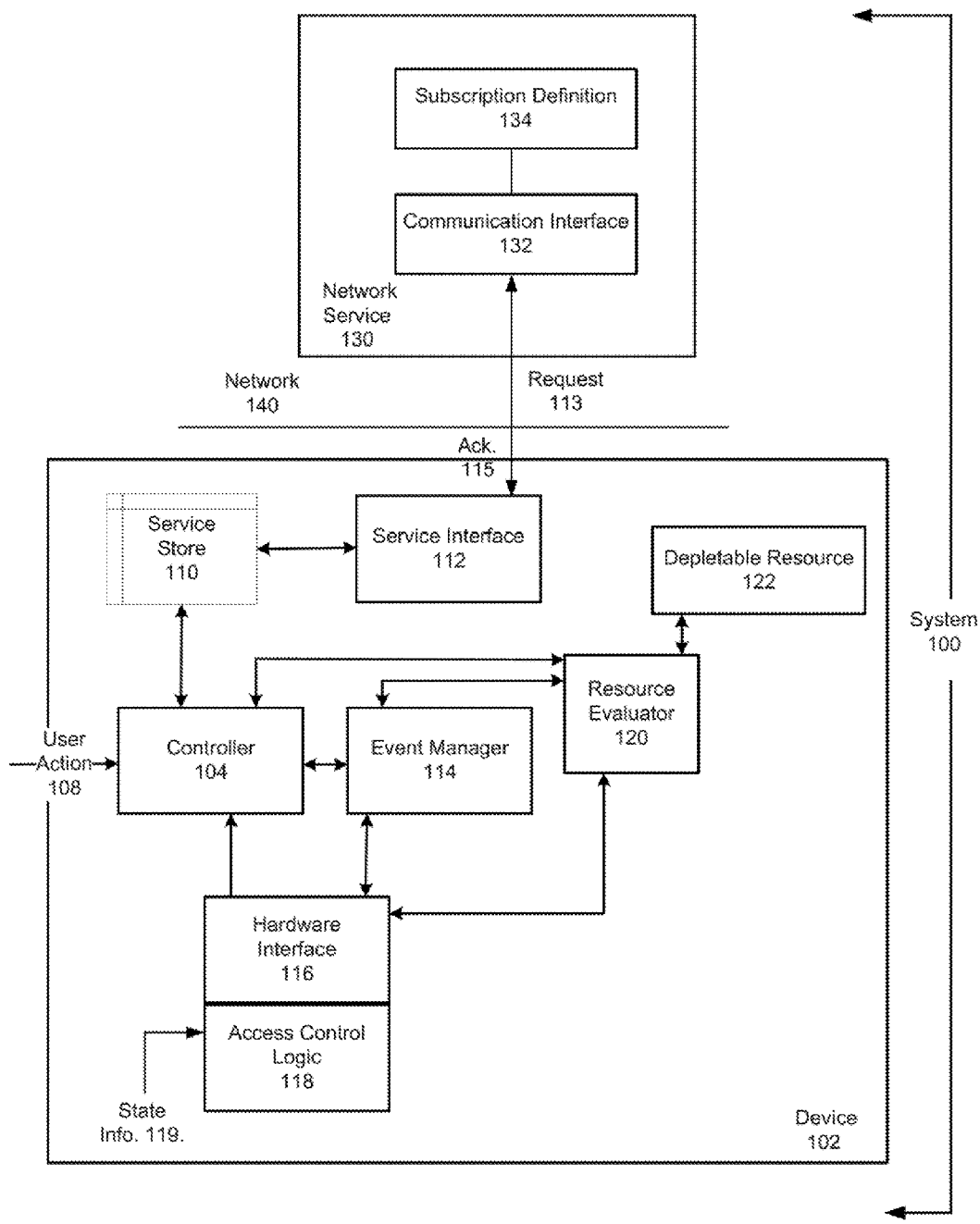
FIG. 1 illustrates an example system for controlling a network-enabled device in connection with its use of a depletable resource.

A network-enabled device is provided that can manage a depletable resource in a manner that controls how a user can replenish or access the depletable resource. In some examples, the network-enabled can operate to permit user access to the depletable resource only if information stored on the device indicates that the replenishment for the depleted resource is being obtained from an appropriate or approved source.

In an example, a web-based printer includes logic and physical control elements that limit access to the ink resource. The printer permits user access to the ink resource when information stored on the device indicates the ink was (or had been obtained) from an appropriate or approved source.

By way of example, a network-enabled device (e.g., printer) can be operated under a network subscription plan that enables automated (or partially automated) delivery of a depleted resource (ink resource). The determination as to whether the user is permitted to access the depleted resource can entail status of replenishment and adherence to the subscription. These and other examples are described in greater detail below.

According to some examples, a network-enabled device processes an input for performing an action requiring for replenishing a depletable resource of the network-enabled device. A determination is made as to whether replenishment for the depletable resource has been requested from a particular source. If the determination is that replenishment of the depletable resource has been requested from the particular source, then the action is permitted. If the determination is that replenishment has not been requested from the particular source, then the action is precluded from being performed.

The network-enabled device can correspond to any device that utilizes a depletable resource, such as a printer (or variants, such as a copier) (depletable resource is ink), water filter (depletable resource is filter), lighting equipment (depletable resource is light source) etc.

In another example, a printer is controlled by supplying an ink resource to the printer as part of a subscription service. The printer is configured to preclude access to the ink resource unless the ink resource has been requested or ordered through the subscription service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules or components. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as desktop computers, cellular or smart phones, personal digital assistants (PDAs), laptop computers, printers, digital picture frames, and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example system for controlling a network-enabled device in connection with its use of a depletable resource. The system 100 can be implemented in a variety of computing environments. For example, system 100 can be implemented through a combination of servers or other network-enabled computing devices. In other variations, system 100 can be implemented on other computing platforms, including stand-alone systems. As an alternative or addition, some or all of the components of system 100 can be implemented on client devices, such as through applications that operate on user terminals.

With reference to the example of FIG. 1, system 100 includes a device 102 and a network service 130. The device 102 can communicate with the network service 130 for purpose of, for example, receiving services and fulfilling orders or requests. By way of example, device 102 can correspond to a web-enabled printer or copier. More generally, the device 102 can correspond to any device that has a depletable resource (e.g., filter for water filtration, bulb on projector etc.). The network service 130 can communicate with the device 102 for a variety of reasons, including checking operations of the device, to determine status of depletable resources, and/or to enable replenishment.

Device 102 can communicate over network 140 via service interface 112 (e.g., wirelessly or using a wireline) with network service 130. Examples provide for network service 130 to provide a subscription service for device 102. In particular, network service 130 can communicate with the device 102 to check status of a depletable resource, and further to perform actions that replenish depletable resource 122 on the device 102. For example, as part of the subscription service, network service 130 may physically deliver (e.g., through shipping service) a replacement for a depletable resource of device 102. As part of the delivery process, network service 130 may store information to enable subscription services, including information to identify device 102, a user of the device 102, and conditions or timing which can determine when device 102 is replenished.

In implementations, device 102 utilizes programmatic mechanisms to control the device in permitting or preventing the user from to have access to the depletable resource 122. For example, depletable resource 122 may be coupled, attached, or locked into place on device 102 through a mechanical component, and programmatic elements may control the release of the mechanical component. As provided herein, device 102 may be made accessible to a user by controller 104 when certain conditions are met.

According to some examples, device 102 connects to network service 130 over a network 140 (e.g. the Internet). Device 102 transmits request 113 and receives acknowledgment 115 from the network service 130. Variations provide for acknowledgement 115 to include information about depletable resource 122 to network service 130. In implementations, network service 130 provides acknowledgement 115 as part of a subscription service. In one implementation, the device 102 issues a request for a depletable resource when the resource is detected as being depleted, and in response, the service 130 issues an acknowledgement that the order has been fulfilled (e.g., more resource has been shipped). In variations, the network service 130 can poll the device 102 for the status of its depletable resource, and then issue fulfillment in response to communication provided from the device 102. Still further, the network service 130 may simply provide replenishment of the depletable resource on a periodic basis, assuming certain usage. Numerous other variations as to the manner in which the depletable resource 122 is replenished can be implemented.

In another example, the subscription service performs other services, such as maintenance or remote access and use. For example, in the implementation in which the device 102 is a printer, the network service 130 can provide cloud printing services.

Among other functions, an example of FIG. 1 provides that the device 102 and network service 130 can combine to (i) monitor and replenish depletable resources 122 of the device 102, and (ii) control the replacement of depletable resource 122. In particular, the device 102 can operate to control access and replenishment of depletable resource 122, to coincide with fulfillment orders made through the network service 130. By way of example, network service 130 can provide a subscription service for replenishing the depletable resource 122. As a safeguard for preventing the user of device 102 from non-permitted access to the depletable resource, device 102 may be equipped with mechanisms that preclude access to the depletable resource 122, or replenishment of it, unless some precondition has been satisfied coinciding with fulfillment orders from the network service 130. For example, a user may be precluded from removing the depletable resource 122 unless network service 130 has already fulfilled an order or request for that resource from the device 102.

Among other benefits, an operator of system 100 and/or network service 130 can implement user control of the depletable resource 122 until replenishment is needed, and further until fulfillment has been requested from the network service 130. This allows for the network service 130 to control replenishment of depletable resource 122, so that it can offer subscription-based pricing for some users, without fear that the user would interfere with the replenishment of depletable resource 122.

In one implementation, the device 102 includes a controller 104, service interface 112, and an access control logic 118. The components can be implemented using a combination of hardware, logic and/or software. The device 102 can use access control logic 118 to control access to the depletable resource 122. The access control logic 118 can be provided as part of the controller 104, or alternatively as a separate component (as shown by an example of FIG. 1). The access control logic 118 can signal a hardware interface 116 in order to enable or preclude access to the depletable resource 122. The hardware interface 116 can correspond to an electromechanical component that can physically impede access to the depletable resource 122. The access control logic 118 can set a logic-based locking mechanism in combination with the hardware interface 116 to either grant or preclude access to the depletable resource 122. The controller 104 can communicate with access control logic 118 in order to control the logic for providing access to the hardware interface 116. Additionally, access control logic 118 can use or obtain state information, either through the controller 104 or independently, in order to override or supplement conditions for when access is granted or denied to the depletable resource 122.

The service interface 112 can correspond to a logical component (e.g., application or process) that communicates with the network service 130 in order to obtain information for use in enabling the device 102 to control access or use of the depletable resource. In one implementation, the service interface 112 communicates information ("status information") to the network service 130 regarding the status of the depletable resource 122. In the case of ink, for example, the service interface 112 can communicate status information corresponding to ink levels of the device 102. The service interface 112 can also make requests 113 from the network service 130 for additional resources. The requests can be made programmatically or manually.

In one implementation, the requests 113 are generated automatically, or programmatically in response to depletion conditions. For example, resource evaluator 120 can monitor the depletable resource 122 and determine if replenishment requests are needed. The resource evaluator 120 can correspond to a sensor-based component that checks, for example, fluid or volume levels, weight etc. for purpose of determining a depletion status of the depletable resource. The resource evaluator 120 can further communicate information to the controller 104 regarding the status of the depletable resource 122.

Furthermore, in one implementation, the acknowledgement 115 can be stored in service store 110. The controller 104 can access the service store 110 in order to determine, for example, the status of a fulfillment request based on the acknowledgement 115. As an addition, the service store can include, with acknowledgement 115, additional information, such as what resource the user is receiving, and an expected date.

Variations provide for subscription information to be included as part of acknowledgement 115 transmitted to device 102. In such variations network service 130 can store the subscription information as part of subscription definition 134. For example, subscription definition 134 can store information identifying a subscriber. In another example, subscription definition 134 stores information confirming the validity of a subscriber's subscription. In a third example, subscription definition 134 stores information that a particular new resource is expected to be received or used by device 102 in order to replenish depletable resource 122.

The controller 104 can perform operations for controlling use of the depletable resource 122, as well as communicating with the network service 130 to receive information relating to fulfillments etc. In some examples, controller 104 uses information from the service store 110 in order to perform operations for controlling the depletable resource 122. In particular, as described below, the controller 104 can preclude access (e.g., control access control logic 118 and hardware interface 116) from enabling a user to access the depletable resource 122. For example, in an implementation in which the device 102 is a printer, examples recognize that a user can attempt to access a depletable resource corresponding to an ink cartridge, toner module, bay of ink cartridges, or manually through the housing of the device. The controller 104 can limit or preclude access to the ink, through logic that, for example, controls the access control logic 118 and/or hardware resource 116. In some examples, the controller 104 can also obtain and/or communicate state information 119 in controlling the depletable resource and interpreting user action. State information 119 can correspond to, for example, the operational status of individual components that comprise the device 102. For printers, for example, state information 119 can correspond to ink level, paper jam, device operation level etc.

As an addition or alternative, the controller 104 can use the state information 119 along with acknowledgement 115 (or other information received from the network service 130) in controlling access to the depletable resource. For example, state information 119 can define pre-conditions for permitting or denying access to the depletable resource 122. In one implementation, the controller 104 operates the access control logic 118 and/or hardware interface to limit access to the depletable resource only when the state information indicates that the depletable resource is in need of replenishment. In variations, state information 119 can be used to determine when the user is able to access portions of the device (e.g., when state information 119 indicates repair or maintenance is needed).

In another example controller 104 retrieves control information from service store 110 and uses the information to either enable or preclude user access to depletable resource 122. For example, the control information can correspond to service interface 112 determining that depletable resource 122 should be replenished. Accordingly, system 100 can be implemented as a service that can enable a network-enabled device 102 to determine whether to enable or preclude replacement of the depletable device resource 122 associated with device 102. In an example, this determination is based on a second determination that a replacement for depletable resource 122 was requested from a particular network service 130.

Some examples recognize that unauthorized use or access of depletable resource 122 can be attempted through mechanical interaction with the device 102. For example, in the case of a printer, the user may attempt to lift the lid or access to ink cartridge through the housing. In some examples, device 102 can include an event manager 114 that monitors event such as mechanical interactions, for purpose of determining when the user attempts access to the depletable resource 122.

In another example network service 130 is implemented as part of a cloud printing service and device 102 is associated with the cloud printing service. In a third example, device 102 is part of a subscription-based web service, and a replacement for depletable resource 122 is supplied as part of the subscription-based web service. The web service may be provided by network service 130 or a third party.

In an example, service store 110 can receive and store subscription information (e.g. stores information about whether a replenishment order is being fulfilled), which can be communicated from network service 130 via service interface 112. In an example of FIG. 1, user action 108 corresponds to a user-desired action to manually replenish depletable resource 122 (e.g., user operates user interface to instruct printer to change ink cartridge, user lifts lid etc.). Depending on implementation, the action 108 can correspond to user input (e.g., made through a user interface) or to the user manipulating physical components of the device. The latter kind of action may be detected by, for example, event manager 114, which can employ sensors and/or other electromechanical components to determine when such physical manipulation occurs.

In response to user action 108, device controller 104 accesses service store 110 to determine whether an intended action (as determined from the user action 108) should be permitted, based on the subscription information maintained in the service store 110. For example, the determination may be based on whether a subscription definition permits the action to be performed on depletable device resource 122, under what conditions (e.g., near the time when new refill is to be send) etc.

In another example, device 102 automatically causes a replacement for depletable resource 122 to be ordered from network service 130 in response to a depletion condition. For example resource evaluator 120 may determine that depletable device resource 122 is at a low status or otherwise should be replenished. In response, resource evaluator 120 can communicate with device controller 104 to cause service interface 112 to issue an order for a replacement for depletable resource 122 to be sent to device 102. In an example, device 102 is a printer, and depletable resource 122 is an ink resource. In another variation, device 102 is part of a subscription service with network service 130, and device 102 detects a low ink condition (e.g. low ink supply of a particular kind of ink resource) in depletable device resource 122. Service interface 112 then communicates an order with network service 130 (e.g. via request 113) to obtain a new replacement ink source.

In one example, the device 102 corresponds to a printer, and the controller 104 is implemented with a processor. The hardware interface 116 can include an ink retention mechanism, which is controlled by the controller 104 to access and use ink resources. In particular, the controller 104 may communicate with the network service to determine whether an ink resource was ordered, and the controller may control the hardware interface 116 (e.g., the ink retention mechanism) to enable replacement of an existing ink resource only if the controller determines that the ink resource was ordered from the network service 130.

In still another example, the network service 130 may control the network-enabled device (e.g., printer). Specifically, the network service 130 may provide an ink resource to the printer as part of a subscription service. The printer may be configured (e.g., by the network service 130) to preclude access to the ink resource unless the ink resource has been requested or ordered through the subscription service.

Methodology

Figure 2:
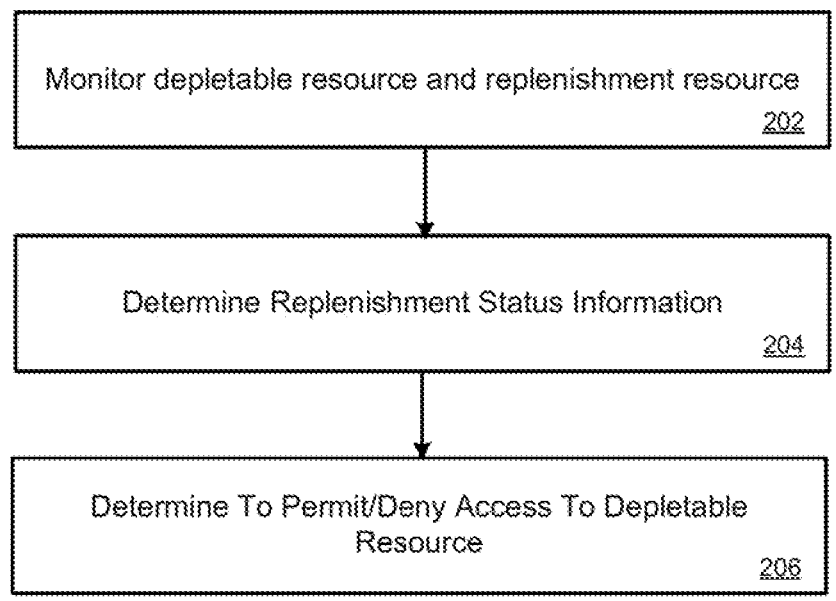
FIG. 2 illustrates an example method for managing access to a depletable resource of a network-enabled device.
Figure 3:
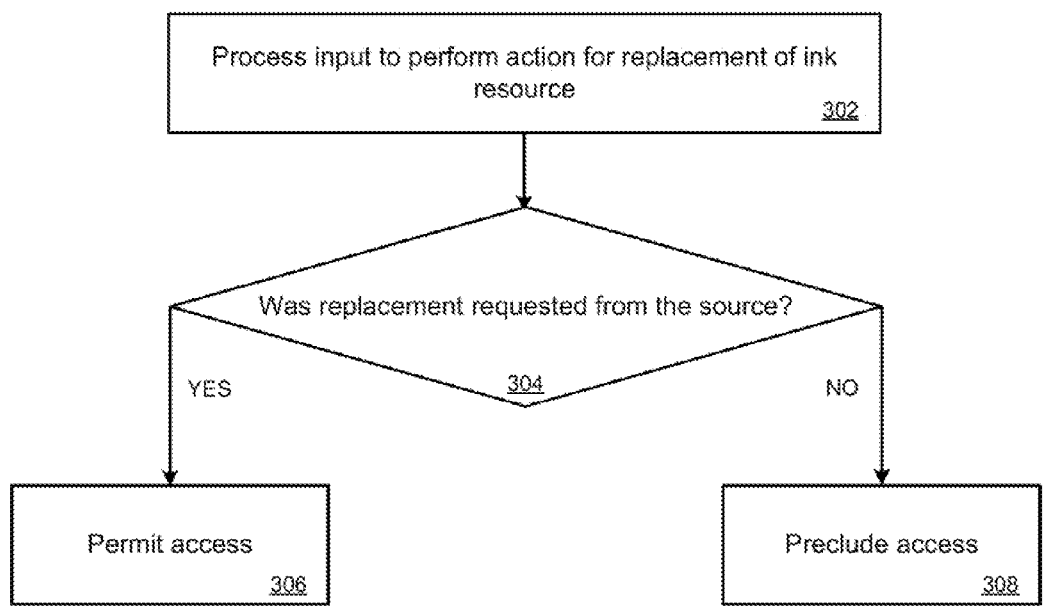
FIG. 3 illustrates another example for determining whether a user should access a depletable resource of a computing device.

FIG. 2 illustrates an example method for managing access to a depletable resource of a network-enabled device. FIG. 3 illustrates another example for determining whether a user should access a depletable resource of a computing device. Methods such as described by FIG. 2 or FIG. 3 can be implemented using, for example, components described with FIG. 1. Accordingly, references made to elements of FIG. 1 are for purposes of illustrating suitable elements or components for performing a step or sub-step being described.

As illustrated in the example of FIG. 1, device 102 (through, for example, resource evaluator 120) monitors the depletable device resource 122 (Step 202). Examples provide that resource evaluator 120 may monitor a status or state of the depletable device resource 122. For example, in an implementation where the depletable device resource 122 is an ink cartridge, the resource evaluator 120 may monitor an ink level of a type of ink on the cartridge. The information produced by the monitoring of step 200 may be stored on the device 102 or communicated used to request replenishment of the depletable resource 122. As an addition or alternative, the monitored information may further be communicated to a user of the network-enabled device. This enables the user to determine the status of the depletable device resource 122. In some implementations, the information can, for example, be determined programmatically from the resource evaluator 120.

Separately, the device 102 maintains information as to the status of a replenishment resource (204). The replenishment status information can have different forms and content based on implementation. For example, the replenishment status information can indicate whether (i) replenishment was requested from the network service 130 (or other appropriate source), (ii) replenishment was shipped from an appropriate source, (iii) replenishment should have been received from an appropriate source, and/or (iv) replenishment at the particular moment was appropriate based on the subscription plan of the user.

Components of device 102 can detect when access to the depletable resource 122 is permitted (206). The access permission can be logically determined from (i) replenishment status information, and/or (ii) state of depletable resource (as determined in 202). When such access (or need for access) is detected, the controller 104, for example, may check the service store for replenishment status information, as well as against other state information for the device.

In an example the level of access control may be either permitted (which causes the device controller 104 to enable the action via access control logic 118/hardware interface 116) or unpermitted (which causes the device controller 104 to preclude the action via access control logic 118/hardware interface 116).

In another example, if the determination is that replacement of the depletable resource was earlier requested from the particular source, then access to the depletable resource 122 may be permitted.

With reference to FIG. 3, the controller 104 can process input (or user action) for accessing the depletable resource (302). For example, the user may enter input through the user interface to access the depletable resource, or sensors attached with hardware for retaining the depletable resource may signal attempted user access. In response to detecting the action, the controller 104 checks to determine whether replenishment for the depletable resource was fulfilled (or being fulfilled) from an appropriate source (e.g., network service 130) (304).

If the determination (304) is that the replenishment was requested from an appropriate source, then access to the depletable resource 122 may be granted (306). Else access may be mechanically (and logically) precluded (308).

By way of example, event manager 114 may include sensors or other components that detect user action 108 to gain access to the depleted resource. The event manager 114 may signal the controller 104, which in turn checks the service store 110 to determine if information from network service 130 indicates replenishment is being provided from an appropriate source (e.g., the network service 130). If the service store 110 indicates replenishment is being provided from the appropriate source (e.g., network service 130), then the controller 104 signals the control logic 18 for the hardware interface 116 to permit the user to access the depletable resource 122. Else the controller 104 can signal the access control logic 118 to maintain a lock state with the hardware interface 116.

Depending on implementation, the service store 110 may maintain information indicating anyone or more of the following: (i) replenishment was requested from the network service 130 (or other appropriate source), (ii) replenishment was shipped from an appropriate source, (iii) replenishment should have been received from an appropriate source, and/or (iv) replenishment at the particular moment was appropriate based on the subscription plan of the user.

Hardware Diagram

Figure 4:
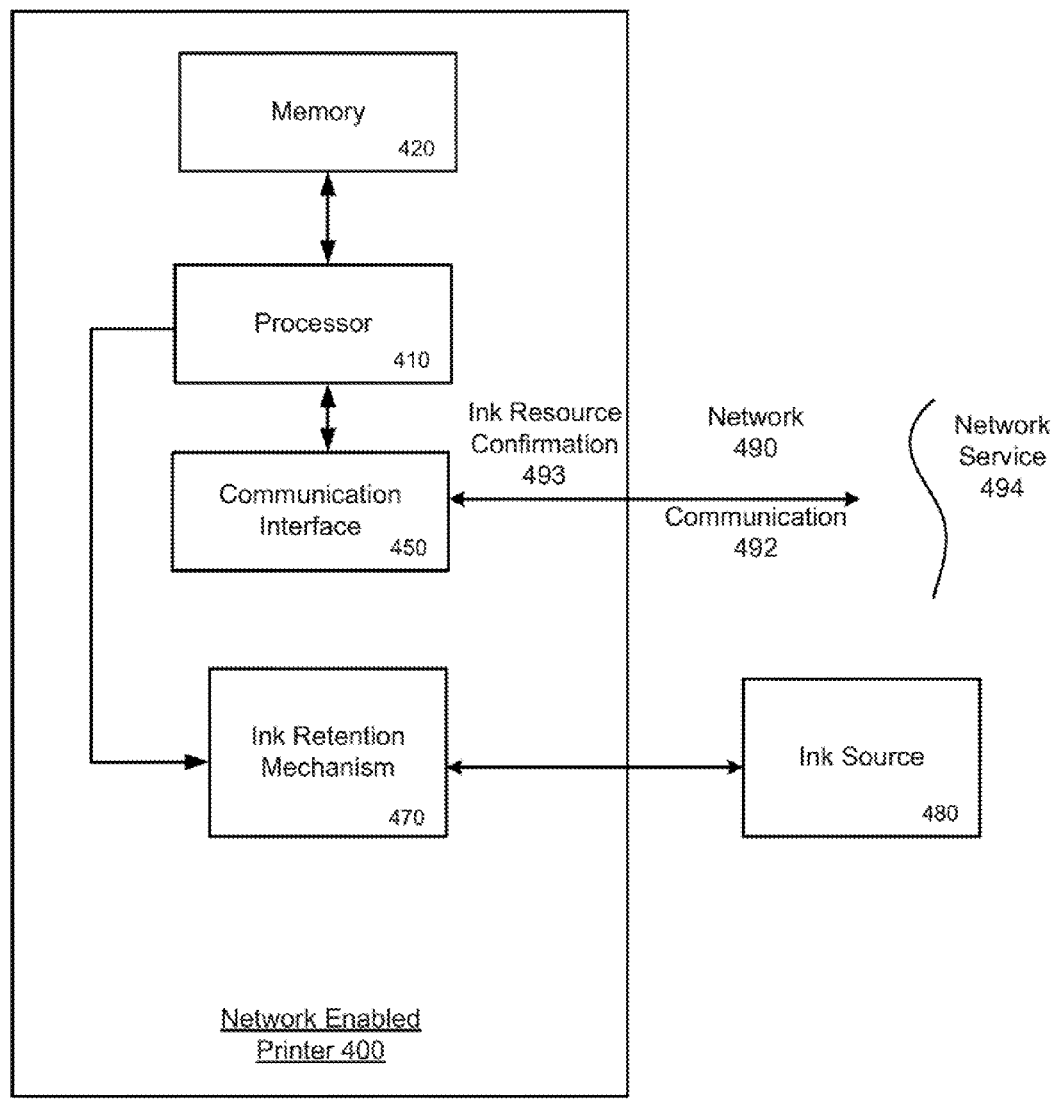
FIG. 4 is a block diagram that illustrates a network-enabled device upon which examples described herein may be implemented.

FIG. 4 is a block diagram that illustrates a network-enabled printer upon which examples described herein may be implemented. In particular, network-enabled printer is an example of a network-enabled device as described with FIG. 1 and elsewhere. Other examples of network-enabled device include copiers, filters, appliances, lighting equipment etc.

In one implementation, printer 400 includes processor 410, memory 420, and communication interface 450. Printer 400 includes at least one processor 410 for processing information. Printer 400 also includes a memory 420, such as a random access memory (RAM) or other dynamic storage device, for storing information and instructions to be executed by the processor 410. Memory 420 also may be used for storing temporary variables or other intermediate information during execution of instructions to be executed by processor 410. Among other data and instructions, the memory 420 can store instructions for enabling the processor 410 to implement functionality for use with or as controller 104, service interface 112, access control logic 118, and/or other components.

The communication interface 450 enables printer 400 to communicate with one or more networks through use of a network link (wireless or wireline). Using the network link, the printer 400 can communicate with one or more resource providers, and/or one or more cloud services. In some examples, the printer 400 can receive, via the network link, information, such as communication 492, submitted by one or more resource providers, which includes information about network services and/or device services that the printer has access to. The information can be stored in, for example, memory 420. As described with prior examples, the communications 492 can be submitted from network service 494 and include information for identifying replenishment for ink resource 480. Furthermore, the printer 400 may communicate to the network service 494 using the communication interface such as to provide reports about the printer 400.

The processor 410 can implement controller functionality to control use of ink retention mechanism 470. The ink retention mechanism 470 can retain a depletable resource such as ink, an ink cartridge, toner etc. The ink retention mechanism can include sensors, processing resources and hardware for enabling the processor 410 to control and manage access of the ink resource. In managing the depletable resource (e.g., ink), the processor 410 can communicate across a network with an ink source 480 (e.g., ink subscription service).

The processor 410 can also implement controller functionality to monitor the level of the ink resource. For example, the ink resource may include a quantity of a specific ink (e.g. a color), ink cartridge, toner or other unit which is used in the operation of the printer. The processor 410 may monitor a level of an ink resource in the cartridge, such as through sensors of the ink retention mechanism 470. The processor 410 can also determine when a level of ink in the cartridge is below a predetermined level (e.g., that the entire ink cartridge is in need of replacement). In another example the printer 400 may determine that only the particular ink resource need be replaced without replacing the cartridge.

In operation, the processor 410 can respond to events that correspond to a user action to access the ink resource. For example, the processor 410 may control the ink retention mechanism 470 to preclude access to the ink resource unless data stored on the printer 400 indicates that ink replenishment was received from an appropriate source (e.g., network service 494). The processor 410 can permit or preclude an action to be performed on the ink resource by controlling the ink retention mechanism 470. In one implementation, communication interface 450 receives ink resource confirmation 493 from the network service 494. This confirmation can be stored in memory 420, and the processor 410 can access the memory for the information in response to some event (E.g., user action to access ink). Based on the confirmation 493, the processor may, for example, unlock or release the ink retention mechanism 470. [0057] Optional components can include a display. The display may include appropriate type of display device such as a display screen for displaying graphics and information to a user. A user action can also be received via an input mechanism, such as push buttons which enable user selection input. The screen may also be used to display graphic buttons or similar input mechanisms.

Examples described herein are related to the use of printer 400 for implementing the techniques described herein. According to one example, those techniques are performed by printer 400 in response to processor 410 executing one or more sequences of one or more instructions contained in memory 420. Such instructions may be read into memory 420 from another machine-readable medium, such as storage device 440. Execution of the sequences of instructions contained in memory 420 causes processor 410 to perform the process steps described herein. In alternative examples, hard-wired circuitry may be used in place of or in combination with software instructions to implement examples described herein. Thus, examples described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A non-transitory computer-readable medium that stores instructions for controlling a network-enabled device, the non-transitory computer-readable medium including instructions, that when executed by one or more processors of the network-enabled device, cause the network-enabled device to:

detect a particular action required to access a depletable resource of the network-enabled device;

in response to the detection of the particular action required to access the depletable resource, determine, whether a data store of the network-enabled device contains an acknowledgement indicating that a replacement of the depletable resource is provided from a particular network service;

in response to a determination that the data store of the network-enabled device contains the acknowledgement indicating that the replacement of the depletable resource is provided from the particular network service, enable the particular action to be performed to permit access to the depletable resource for replacement; and in response to a determination that the data store of the network-enabled device does not contain the acknowledgement indicating that the replacement of the depletable resource is provided from the particular network service, preclude the particular action from being performed.

2. The non-transitory computer-readable medium of claim 1, wherein the instructions cause the network-enabled device to receive an input corresponding to a user attempting to access the depletable resource.

3. The non-transitory computer-readable medium of claim 1, wherein instructions further cause the network-enabled device to determine whether the replacement was requested from a web-service associated with the network-enabled device.

4. The non-transitory computer-readable medium of claim 3, wherein the web-service includes a subscription based web-service.

5. The non-transitory computer-readable medium of claim 1, wherein the network-enabled device corresponds to a network-enabled printer, and wherein the depletable resource corresponds to an ink resource.

6. A method for controlling a printer, the method comprising:

detecting, by a processor of the printer, a particular action required to access an ink resource of the printer;

in response to detecting the particular action required to access the ink resource of the printer, determining, by the processor of the printer, whether a data store of the printer contains an acknowledgement indicating that a replacement of the ink resource is provided from a particular network service;

in response to a determination that the data store of the printer contains the acknowledgement indicating that the replacement of the ink resource is provided from the particular network service, enabling, by the processor of, the printer, the particular action to be performed to permit access to the ink resource for replacement; and in response to a determination that the data store does not contain the acknowledgement indicating that the replacement of the ink resource is provided from the particular network service, configuring the printer to preclude access to the ink resource.

7. The method of claim 6, wherein the method further includes receiving an input corresponding to a user attempting to access the ink resource.

8. The method of claim 6, wherein the method further includes determining whether the ink resource was requested due to a subscription service.

9. The method of claim 6, wherein the method further includes detecting a depletion condition of the ink resource on the printer.

10. The method of claim 9, wherein the method further includes determining that the ink resource includes one or more identification features corresponding to a subscription service.

11. The method of claim 6, wherein the printer is network-enabled, and wherein enabling the particular action to be performed includes enabling the ink resource to be installed at the printer.

12. A printer comprising:
a processor;
a data store;
a communication interface to communicate with a network service over a network; and
an ink retention mechanism;
wherein the processor, in response to detecting a particular action required to access and replace an existing ink resource, is to determine whether the data store of the printer contains an acknowledgement indicating that an ink resource is provided from the network service; and
wherein the processor controls the ink retention mechanism to enable a replacement of the existing ink resource only if the processor determines that the data store of the printer contains the acknowledgement indicating that the ink resource is provided from the network service.

13. The printer of claim 12, wherein the processor automatically causes the ink resource to be ordered in response to a depletion condition.

14. The printer of claim 12, wherein to enable the replacement of the existing ink resource, the processor is to enable an installation of an ink cartridge.

* * * * *

UNITED STATES PATENT AND TRADEMARK OFFICE
CERTIFICATE OF CORRECTION

PATENT NO. : 9,684,478 B2
APPLICATION NO. : 14/764743
DATED : June 20, 2017
INVENTOR(S) : Padmanabhan Ramchandran Page 1 of 1

It is certified that error appears in the above-identified patent and that said Letters Patent is hereby corrected as shown below:

On the Title Page

In item (74), Attorney, in Column 2, Line 2, delete "Dpartment" and insert -- Department --, therefor.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*